Feb. 8, 1966     L. C. BOHN     3,234,507
CURB DISTANCE INDICATOR

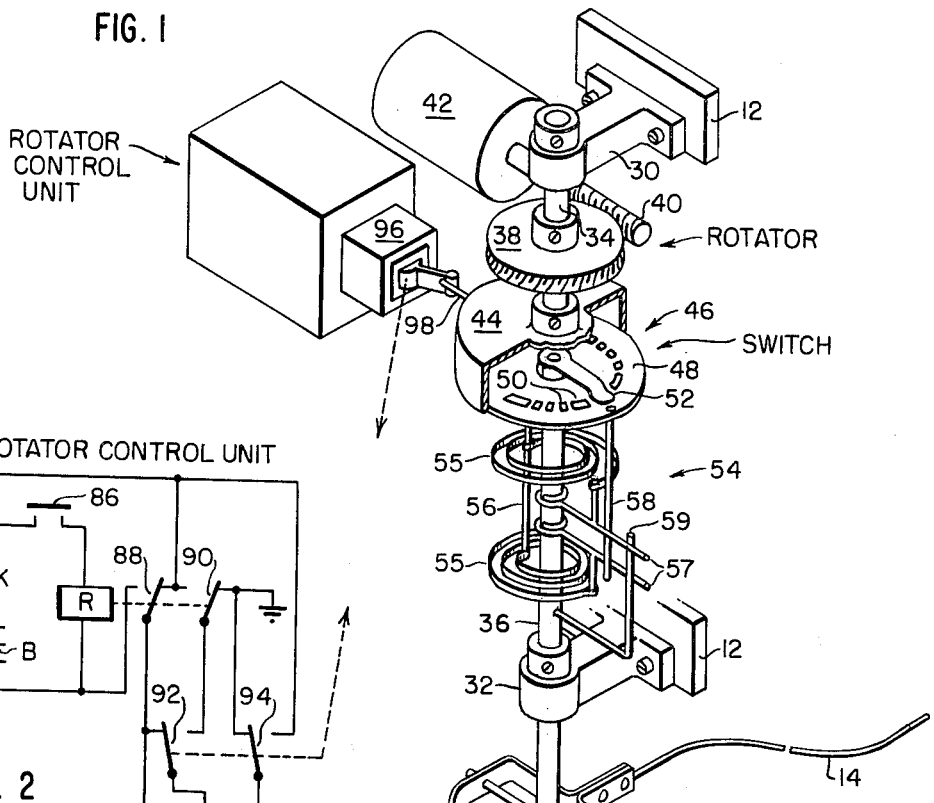
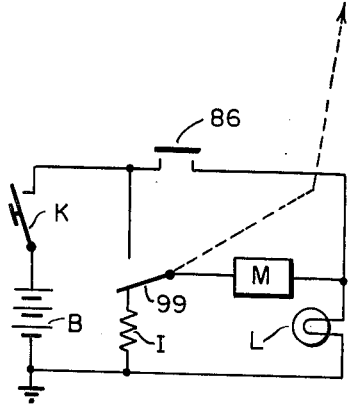

Filed Feb. 2, 1962     2 Sheets-Sheet 2

INVENTOR.
LEWIS C. BOHN
BY *Kenway Jenney*
*& Hildreth*
ATTORNEYS

United States Patent Office 3,234,507
Patented Feb. 8, 1966

3,234,507
CURB DISTANCE INDICATOR
Lewis C. Bohn, Old Albany Post Road, Ossining, N.Y.
Filed Feb. 2, 1962, Ser. No. 170,706
6 Claims. (Cl. 340—61)

The present invention relates generally to curb distance indicating devices. More particularly, it relates to apparatus for indicating the distance of a self-propelled vehicle from a curb by means of a sensor element extending from the vehicle and engaging the curb, the apparatus being provided with means for reorienting the sensor element when the direction of movement of the vehicle is reversed.

Various devices have been proposed for performing the function of curb distance indication, the most common being the type having flexible metallic sensor elements or "feelers" clamped to the body of the vehicle and extending laterally of the vehicle toward the curb. This type of sensor element makes a sound audible within the vehicle upon striking the curb. Other, more sophisticated, devices have also been proposed, and these also operate by means of a sensor element or elements physically engaging the curb. These prior art devices have proven unsatisfactory for various reasons including faulty operation of and physical damage to the sensor element resulting from reversal of direction of movement of the vehicle while the element is in contact with the curb. Since these devices require deflection of the sensor element, it follows that reversal of movement of the vehicle during engagement of the sensor element with the curb causes it to slide against the curb surface in such a direction as to create a possibility of temporary arrest of the curb-engaging tip, thus producing a severe distortion of the element and possible erratic behavior of the indicating means. A principal object of this invention is to provide a curb distance indicating device operating by means of a curb-engaging sensor element, wherein provision is made for avoiding damage or erratic operation as a result of such a reversal of direction.

A second object is to provide a dependable mechanism and associated control circuits for operation to indicate accurately the distance of the vehicle from the curb.

A further object is to provide for dependability of operation of the device upon bumpy or irregular road surfaces, at high speeds and during sharp turning movements, as well as under varying wind conditions, especially those arising from motion of the vehicle.

With the foregoing and other objects hereinafter discussed in view, a feature of this invention resides in the provision of means for reorienting the sensor element by rotation upon each reversal in the direction of movement of the vehicle, whereby if the element is in contact with a curb at the moment when reversal is effected, the rotation causes the element to move away from the curb to a new position in which it is oriented to the latter in a manner which will provide correct operation for the new direction of movement.

A second feature is the use of disconnect means to disable the indicating means associated with the sensor element, at higher speeds.

A third feature of the invention resides in the specific configuration of parts, wherein there is provided a rotary switch having contacts and a brush movable relatively to the contacts as a function of the deflection of the sensor element by the curb.

A fourth feature resides in the provision of means for resiliently tending to restore the sensor element to a predetermined "normal" position in relation to the vehicle.

According to still another feature, the means for resiliently tending to restore the sensor element to a predetermined position are controlled by the reorientation means, whereby upon reversal of the direction of movement, the resilient restoring means are employed to cause the sensor element to rotate away from the direction of the curb through a predetermined angle so that it is again in position to engage the curb but with a deflection opposite to that resulting from the previous direction of movement of the vehicle.

Other features of the invention resides in certain details of construction, configurations of the parts and modes of operation which are described in the following specification, considered with the appended drawings illustrating a preferred embodiment.

In the drawings, FIG. 1 is a view in perspective of the principal mechanical elements of a curb distance indicating device suitable for use in a motor vehicle, according to the present invention;

FIG. 2 is a schematic circuit diagram of controls associated with the mechanism of FIG. 1;

FIG. 2a is a schematic circuit diagram of an alternative control circuit of simpler form;

For purposes of illustration, a typical embodiment of the invention, which is preferred for use in an automobile, is herein described in detail. Preferably, two separate curb indicating devices are provided for the vehicle because separate indications are desired for the distances of the front and rear wheels from the curb.

Figure 4A:
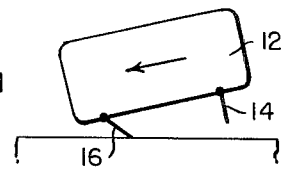
FIGS. 4a and 4b are similar to FIGS. 3a and 3b, but illustrate the case of the vehicle when disposed at an angle to the curb at the moment of reversal of direction of movement.
Figure 4B:
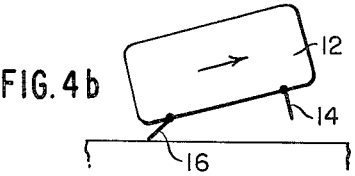

Referring to FIGS. 4a and 4b, there is shown a vehicle 12 having a front sensor element 14 and a rear sensor element 16. The element 14 is shown with its associated mechanism in detail in FIG. 1. The element 16 may be identical to the element 14 and is associated with another identical mechanism. These elements are mounted upon the vehicle 12 in the manner shown in detail in FIG. 1 and hereinafter more fully described. In general, provision is made to support each of the sensor elements resiliently in a "normal" position extending generally at right angles to the direction of forward movement of the vehicle, that is, to the center line extending from front to back. Thus when a sensor element is out of contact with the curb, it is in the "normal" position as shown for the element 14 in FIGS. 4a, 4b. However, the sensor elements may each be deflected about an axis normal to the general plane of the roadbed by contact with the curb, as shown for the element 16 in FIGS. 4a and 4b.

FIG. 4a illustrates the case of a vehicle being backed up to a curb, wherein the element 16 is the first to strike the curb. Assume, for example, that the vehicle is stopped in the position shown in FIG. 4a, and that the gears are shifted from "reverse" to "forward." If, contrary to this invention, this shifting of the gears were not to change the orientation of the element 16 to the curb, it would be apparent that the element might be damaged by the ensuing forward motion of the vehicle. According to this invention, however, the reversal of the gears produces an immediate discrete angular rotation of the elements 14 and 16 in the counter-clockwise direction as viewed in FIG. 4a, whereby after such rotation the element 14 reaches its original "normal" position and the element 16 reaches the position illustrated in FIG. 4b. Thus in the ensuing forward movement of the vehicle, as represented by the arrow in FIG. 4b, the element 16 will not be damaged and will give a correct indication.

Figure 3A:
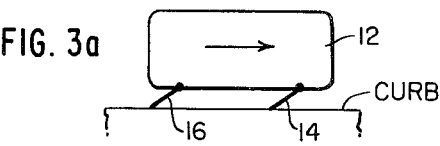
FIG. 3a illustrates in plan view the positions of two sensor elements of the kind shown in FIG. 1 for the motor vehicle when situated parallel to a curb and moving in the direction indicated by an arrow.
Figure 3B:
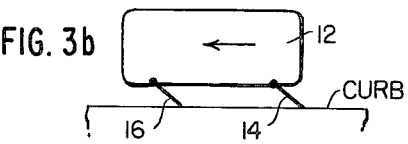
FIG. 3b shows the position of each sensor element which results from a reversal of the direction of movement of the vehicle of FIG. 3a, according to this invention.

FIGS. 3a and 3b provide an illustration similar to FIGS. 4a and 4b for the case in which the vehicle is parallel to the curb with the sensor elements 14 and 16 in contact with it at the moment of gear reversal. In this case shifting the gears from the direction indicated by by the arrow in FIG. 3a to that indicated by the arrow in FIG. 3b causes clockwise rotation of the elements 14 and 16 as viewed in the drawing.

Figure 5A:
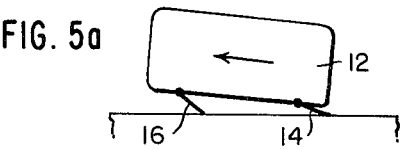
FIGS. 5a and 5b are similar illustrations for the vehicle when disposed at a different angle to the curb.
Figure 5B:
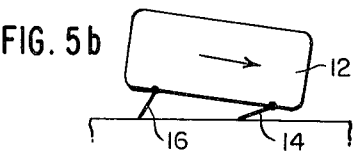

FIGS. 5a and 5b represent a third condition. FIG. 5b represents the positions of the elements 14 and 16 after reorientation thereof from the positions shown in FIG. 5a as the result of a reversal in the direction of the gears.

It will be evident that the features of the invention illustrated in FIGS. 3 to 5 would be beneficial in any curb indicating device based upon the use of curb-contacting sensor elements, regardless of the particular means providing a useful indication of the contact. These features are useful in a device having sound-making sensor elements, for example. However, for purposes of illustration a preferred embodiment is disclosed which provides visual indication of the distance of the vehicle from the curb by means of light bulbs suitably arranged on the vehicle dashboard.

Figure 6:
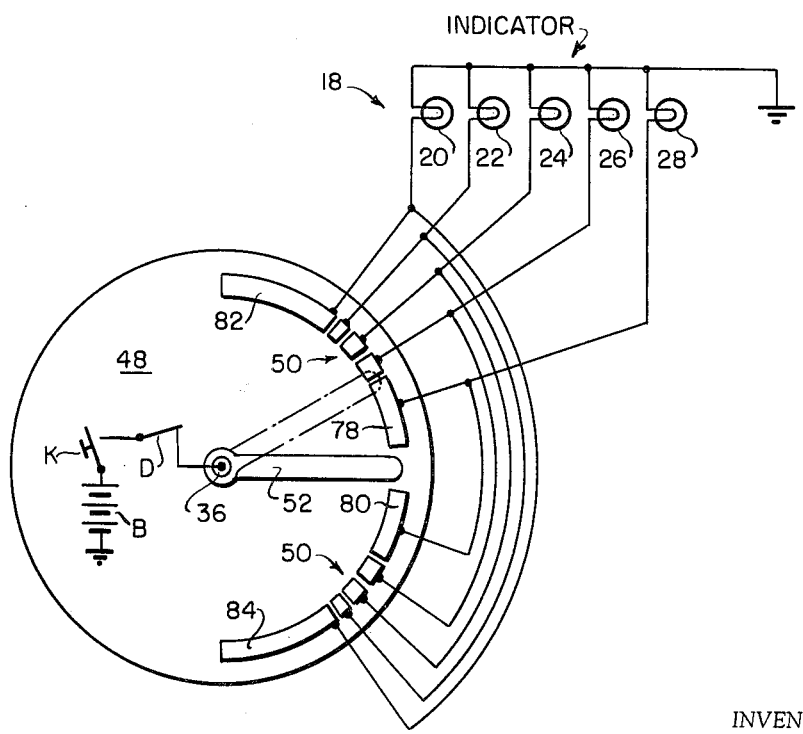
FIG. 6 is a schematic circuit diagram of the indicator panel on the dash board of the motor vehicle, together with a plan view showing details of the contacts on a switch which controls the panel.

For purposes of this description, the distance of the vehicle from the curb is assumed to be the distance from the outer surface of the tire to the generally vertical surface of the curb. In FIG. 6 there is shown an indicator comprising a light panel 18 having lamps 20, 22, 24, 26 and 28. When a vehicle is away from the curb none of the lamps are illuminated. When the vehicle approaches the curb to a position within a given range of distances, a lamp 28 is illuminated. As the vehicle approaches the curb more closely, the lamps 26, 24, 22 and 20 are successively illuminated. When the lamp 20 is illuminated the vehicle is too close to the curb, and when the lamp 28 is illuminated the vehicle is too far. Thus the objective of the operator is to control the vehicle to cause the lamp 22, 24 or 26 to be illuminated for both of the sensor elements 14 and 16, each being independently provided with an indicator light panel as shown in FIG 6. When the corresponding lamp is illuminated in each panel the vehicle is parked parallel to the curb. If desired, various shapes and colors of lamps, or viewing panels placed over the lamps, may be employed to provide a clear indication. Also, buzzers, bells or other audible devices may replace or supplement the lamps to provide further indications. The specific panel 18 will be considered, therefore, as illustrative of the invention, rather than as a limitation or necessary part thereof Referring to FIG. 1, suitable portions of the body or frame of the vehicle 12 are provided with bearing blocks 30 and 32 respectively pivotally supporting in coaxial relationship a rotator shaft 34 and a sensor shaft 36. The axes of these shafts are preferably normal to the general plane of the roadbed. A worm gear 38 is secured to the shaft 34 and engaged with a worm 40 on the rotor shaft of a motor 42. Also secured to the shaft 34 is the housing 44 of a switch designated generally at 46. Fixed to the housing 44 and within it is a contact plate 48 made of insulating material, upon which are mounted a number of electrical contacts 50 shown in detail in FIG. 6. A brush 52 secured to the sensor shaft 36 is adapted to wipe the contacts 50.

The shaft 36 is pivotally supported in the bearing block 32 and tends to reach a "normal" position which is defined in relation to the angular position of the housing 44. In this position the brush 52 is in the position shown in full lines in FIG. 6 and the sensor element 14 is extending laterally of the vehicle at right angles to its center line as previously described. This is accomplished by means of a coil spring device 54 including a pair of opposed coil springs 55 having inner ends secured to a post 56 which is in turn secured to the housing 44. The outer ends of the springs are secured to bars 57 loosely received on the shaft 36. A post 58, also secured to the housing 44, defines the limit positions of the bars 57. A post 59 secured to the shaft 36 and is urged toward the "normal" position as illustrated by the springs 55.

The sensor element 14 is preferably but not necessarily flexible and may be formed of metal, plastic or any other suitable material. It is secured to a yoke 60 which is pivotally supported on a rod 61 extending transversely from and at right angles to the shaft 36. A second yoke 62 is pivotally supported on a rod 64 extending transversely from the shaft 36, the rod 64 being secured to the shaft at right angles to its axis and to the axis of the rod 60. Extending through the arms of the yoke 62 is a rod 66 which passes through a slot 68 in the yoke 60. When the yoke 62 is rotated about the rod 64 the rod 66 depresses the end of the yoke 60 through which is passes, thereby raising the sensor element 14 away from the road.

A flexible wire 70 secured to the yoke 62 hangs vertically and is attached to a wind baffle 72, which may be a flat sheet of metal or other suitable material. A flexible tip 74 of metal or plastic is attached to the wind baffle, preferably so that the tip is situated in the axis 76 of the shaft 36. The tip 74 is arranged to be suspended a certain distance, say, two inches above the road surface, while at the same time the free tip of the sensor element 14 is in position to touch a curb at a point slightly above that elevation, say, at a height of three inches above the road surface. The axial position of the tip 74 is such that when a force is applied to it transversely of the axis 76, no turning torque is applied to the sensor element 14. On the other hand, the lateral force of wind upon the surface of the baffle 72 and lateral mechanical pressure upon the tip 74 cause rotation of the yoke 62 about the rod 64, thus raising the sensor element 14 a corresponding distance from the road.

The mechanical suspension of the sensor element has plural functions. First, it controls the "standstill" height of the sensor element for the condition in which the wire 70 is suspended freely and vertically. Second, wind force upon the sensor element, whether resulting from motion of the vehicle or otherwise, does not produce a torque to turn the sensor element toward the direction of the air stream because the torque on the sensor element is opposed by the torque on the wind baffle 72. To that end, the effective area of the baffle 72 and tip 74 multiplied by their average distance from the axis 76 equals the effective area of the sensor element 14 multiplied by its average distance from that axis. Third, the mechanism responds to particular conditions such as sharp bumps or ruts in the road, to raise the sensor element to a height sufficient to afford clearance over the road, thereby preventing false indications of curb contact.

When the vehicle is clear of the curb the sensor element 14 projects laterally of the forward direction of the vehicle as shown in FIGS. 4a and 4b. The device 54 tends to hold the shaft 36 in the "normal" position. This is the condition of the mechanism when the vehicle gears are in "neutral" or one of the "forward" speeds. If the vehicle is maneuvered in "forward" gear close to a curb, the sensor element 14 is deflected, thereby causing the brush 52 to rotate into connection with one of the contacts 50. Since the width of the brush 52 is less than the space between the closest contacts 78 and 80, there will be a slight initial deflection of the sensor element 14 before the first lamp 28 is lighted.

The spaces between the other adjacent contacts 50, except for the space just referred to, are preferably equal and less than the width of the brush 52 so that for certain angles two lamps may be simultaneously illuminated. Preferably, the widths of the contacts are variable. The contacts 78 and 80 are preferably wider so that the corresponding lamp 28 will be lighted for a relatively large initial angular displacement of the sensor 14 from its "normal" position. For example, when the vehicle is 10 to 12 inches from the curb the lamp 28 may be lighted. On the other hand, the lamp 26, 24 or 22 may be lighted when the vehicle approaches within a distance respectively, of ten, eight, or six inches from the curb. The contacts 82 and 84 may also be of larger size, whereby the lamp 20 will be lighted when the vehicle is at a distance of four inches, or less, from the curb.

It will be understood that in any case the contact spacing arrangement is preferably such that the distance shown by the bulbs on the indicator 18 should correspond exactly to the actual distance of the vehicle from the curb.

The electrical circuit for the light panel 18 includes the battery B of the vehicle ignition system, a disconnect switch D, and the ignition key K of the vehicle which is connected with the brush 52.

Visible dashboard indications are desired only when entering or leaving a parked position adjacent a curb, that is, when the vehicle is in low forward gear, neutral or reverse gear. When the vehicle is in a higher forward gear a false curb contact indication may occasionally result from bumps in the road, wind and tipping of the vehicle as it rounds corners at high speed. To further prevent such false indications the disconnect switch D is in series with the key K and adapted to open the circuit when the vehicle is in any of the higher forward gears. Means to operate the disconnect switch may consist of a connection to the gear shift mechanism or its controls, or a connection to the speedometer cable.

It will be observed that the operation of the circuit of FIG. 6 produces a similar indication on the lamps 18 whether the vehicle is moving forwardly as in FIG. 3a with resultant clockwise deflection of the brush 52 by the curb, or whether the vehicle is operated in reverse as in FIG. 3b with the brush 52 deflected in a counterclockwise direction by the curb.

FIG. 2 shows one circuit for controlling the reorientation of the sensor element 14 by reversal of the direction of propulsion of the vehicle. Contacts 86 connected to the battery B of the vehicle ignition system are closed whenever the vehicle is in the "reverse" gear position. For convenience, the same switch may be employed which is conventionally used to energize the back-up lights of a motor vehicle. The contacts 86 cause energization of a relay R when the vehicle is in "reverse" gear. The relay R has transfer contacts 88 and 90 shown in the positions reached when the relay is unenergized. These contacts are electrically connected with transfer contacts 92 and 94 on a toggle switch 96. The switch 96 is in position to be actuated by an arm 98 attached to the housing 44 of the switch 46. The electrical circuit is also connected with the shunt field F and the armature A of the motor 42 which is preferably a direct current motor.

The operation of the circuit of FIG. 2 is described as follows. Assume that the contacts are in the positions shown when the ignition key K is closed, the vehicle being in "neutral" gear position. The armature A will be energized by current passing through the contacts 88 and 92, while the field F will be energized by current passing through the contacts 88 and 94. The motor 42 will therefore rotate the worm 40, which in turn will rotate the housing 44 until the arm 98 strikes the toggle switch 96, throwing the contacts 92 and 94 to the opposite positions. For the case of vehicles which are to be parked at the right-hand curb, the direction of rotation just described is counterclockwise, when viewed looking downwardly at the road, so that if the sensor element 14 were in contact with the curb, it would move away from the curb to a new position with an opposite inclination to it. The operation of the contacts 92 and 94 shunts the armature A to ground through the contacts 90 and 92, and shunts the field F to the positive side of the battery B through the contacts 88 and 94.

When the circuit has reached the position just described, no current passes through the field F and the armature A of the motor, and the only current drawn is that which operates the indicator lamps 18 through the contacts of the switch 46, so long as the vehicle remains in "neutral" or in any "forward" gear.

When the vehicle is shifted into "reverse" gear, the switch 86 (FIG. 2) is closed, energizing the relay R and operating the contacts 88 and 90. The armature A will be energized by current flowing through the contacts 90 and 92, which are both then in the positions opposite to those illustrated in the drawing. The field F will be energized by current through the contacts 94 and 88 in the direction opposite to that previously described. Accordingly, the motor 42 rotates in the reverse direction, causing the arm 98 to describe approximately a full circle (in the single sensor arrangement described), thus actuating the toggle switch 96 in the direction opposite to that previously described. This restores the contacts 92 and 94 to the positions illustrated. As a result the armature is shunted to ground through the contacts 88 and 92, while the field F is shunted to ground through the contacts 88 and 94. For the case previously discussed this movement results in clockwise rotation of the sensor element 14, looking downwardly at the road. Once again, the circuit of FIG. 2 reaches a condition in which it draws no current as long as the vehicle remains in "reverse" gear with the contacts 86 closed.

The circuit shown in FIG. 2A is an alternative of simpler form that does not include the relay R and uses a single pole toggle switch 99 for actuation by the arm 98. A reversible direct current motor M shown in this figure is the motor 42 of FIG. 1. The battery B, contacts 86 and ignition key K are the same as in FIG. 2. A light L represents the back-up lights on the vehicle.

The position shown in FIG. 2A obtains when the vehicle is in "forward" gear. If the vehicle is then put in "reverse" gear the contacts 86 are closed, and current flows through the contacts 86, the motor M, the contacts 99 and a resistor I. The motor M turns the housing 44 until the arm 98 strikes the toggle switch 99, reversing its position. The motor then stops, being short-circuited by the contacts 86. If the contacts 86 are thereafter opened by shifting into "forward" gear, current flows through the contacts 99, the motor M and the lamp L, and the motor turns the housing in the opposite direction until the arm 98 again actuates the toggle switch back to the position illustrated.

The circuit of FIG. 2A preferably employs a motor M of substantially greater impedance than that of the lamp so that when the lamp and motor are in series, the current will be insufficient to produce appreciable light. The impedances of the lamp L and the resistor I are preferably equal so that the same current flows in the motor M in both directions of its rotation.

If the vehicle is against a curb with the brush 52 engaging one of the contacts 50, for example the contact 82, a shift from "reverse" to "forward" gear causes the brush 52 to engage one of the contacts, for example the contact 84, on the opposite side of the "normal" position of the brush shown in full lines in FIG. 6. Thus if the lamp 20 were lighted with the vehicle in the position of FIG. 3b in "reverse" gear, shifting the vehicle to "forward" gear as shown in FIG. 3a results in rotating the housing 44 counterclockwise, through a full circle, shifting the brush 52 clockwise in relation to the contact plate 48 until the brush comes to rest on the contact 84 and causes the lamp 20 again to be lighted. Thus the visible indication on the dash board remains unchanged, while the sensor element 14 is reoriented to the curb in such a way that the reversal of direction of movement does not cause damage to the sensor element.

A number of alternatives or adaptations of the apparatus may be accomplished. For example, while the rotator has been described as a motor 42, it will be apparent that the motor could be replaced by a solenoid having a rack to turn the gear 38 in one direction when the solenoid is energized and in the other direction when the solenoid is unenergized. Also, the positions of the parts on the shafts 34 and 36 can be rearranged consistently with the above-described functions. Other specific arrangements may be made with respect to the length and relative positions of the contacts 50 in the switch 46.

A further modification of the illustrated embodiment may consist in substituting for the switch 46 another form of device which may be varied by rotation of the shaft 36 to give an indication to the vehicle operator. Such a variable device may consist, for example, of a potentiometer, a variable condenser, or any of several mechanically-linked indicators. A mechanical linkage to this shaft may be made with a flexible cable or hydraulic or pneumatic means of known form, if desired. Electrically variable devices can be employed in association with a galvanometer or other suitable visual indicator, or with audio oscillator circuits as well as other known forms of audio indicators adapted for operation by a variable input of one of the forms indicated above.

Another arrangement which may be employed would include two sensor elements 14 arranged 180 degrees apart, with two arms 98 also 180 degrees apart. In this case one sensor would always be employed for "forward" movement and the other would always be employed for "reverse" movement. Also, the housing 44 would only rotate through 180 degrees when the motor is energized. In like manner, the principles of the invention can be readily applied to more than two sensors, with corresponding smaller angles of rotation of the housing 44, as will be apparent to one skilled in the art.

Other variations and modifications of the described apparatus will occur to those skilled in this art upon a reading of the foregoing specification, and may be carried out within the intended scope of the appended claims and without departing from the spirit and scope of this invention.

Having thus described the invention, I claim:

1. A curb distance indicator for a vehicle, said indicator comprising:
   sensor means;
   rotatable support means resiliently engaged with said sensor means, said support means tending to yieldably maintain said sensor means in a predetermined angular position in relation to said support means;
   means for rotatably mounting said support means on a vehicle;
   means for defining at least two rest positions for said support means, said support means when mounted on a vehicle, and at rest at each of said rest positions, supporting said sensor means so that said sensor means is adapted to engage a curb;
   said support means, when mounted on said vehicle, supporting said sensor means so that at least a portion thereof projects generally laterally of said vehicle so as to be engageable with a curb; and
   said means for mounting said support means on a vehicle enabling said support means to undergo rotational movement so as to move a portion of said sensor means away from a curb with which said portion of said sensor means is engaged and generally toward said vehicle;
   reorienting means for causing said support means to move from each of said rest positions to the other of said rest positions; and
   control means operable in response to each of opposite changes in directional movability of said vehicle to cause said reorienting means to move said support means between said two rest positions, with the direction of movement of said support means in response to each said change in directional movability being such as to cause a portion of said sensor means, when engaged with a curb and deflected away from said predetermined position, to initially move away from said curb so as to relieve said deflection.

2. A curb distance indicator as described in claim 1 in which the control means includes a switch closed to indicate one direction of vehicle movability and open to indicate the other direction of vehicle movability.

3. A curb distance indicator as described in claim 1 wherein the support means is engaged with the sensor means by spring means.

4. A curb distance indicator as described in claim 1 wherein the support means is engaged with the sensor means by spring means, and said indicator includes means to indicate the degree of deflection of the sensor means from the predetermined angular position.

5. A curb distance indicator as described in claim 1 wherein said two rest positions substantially coincide so as to enable said reorienting means to rotate said support means through substantially a full revolution and thereby rotate said sensor means through substantially a full revolution.

6. A curb distance indicator as described in claim 1, in which the reorienting means includes a motor engaged with the support means.

References Cited by the Examiner

UNITED STATES PATENTS

| | | | |
|---|---|---|---|
| 637,873 | 11/1899 | Kahler | 340—271 |
| 1,981,206 | 11/1934 | Strauss | 340—52 |
| 2,259,614 | 10/1941 | Chang | 340—61 |
| 2,440,587 | 4/1948 | Krall | 340—61 |
| 2,490,217 | 12/1949 | Keating | 200—61.44 |
| 2,522,637 | 9/1950 | Pripeton | 340—61 |
| 2,618,712 | 11/1952 | Moledzky | 340—65 |
| 2,847,527 | 8/1958 | Wolters | 340—61 |

FOREIGN PATENTS 688,098 10/1938 Germany.

NEIL C. READ, *Primary Examiner.*